T. L. JONES.

COMBINED HIGH AND LOW PRESSURE ENGINES.

No. 7,585. Reissued April 3, 1877.

WITNESSES.

Fred K. Leaf

W. J. Smith

INVENTOR.

Thos. L. Jones,

By Chas. D. Moody, atty.

UNITED STATES PATENT OFFICE.

THOMAS L. JONES, OF NATCHEZ, MISSISSIPPI.

IMPROVEMENT IN COMBINED HIGH AND LOW PRESSURE ENGINES.

Specification forming part of Letters Patent No. 76,776, dated April 14, 1868; reissue No. 7,585, dated April 3, 1877; application filed October 10, 1874.

*To all whom it may concern:*

Be it known that I, THOMAS L. JONES, a resident of Natchez, Adams county, State of Mississippi, have invented a new and Improved Combined High and Low Pressure Engine, of which the following is a full, clear, and exact description, reference being had to the annexed drawing, making part of this specification, in which—

Figure 1:
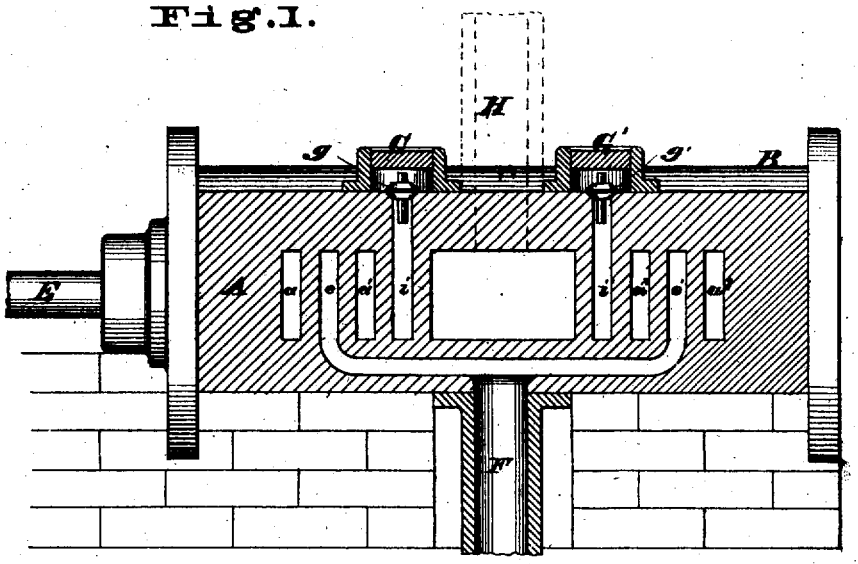
Figure 2:
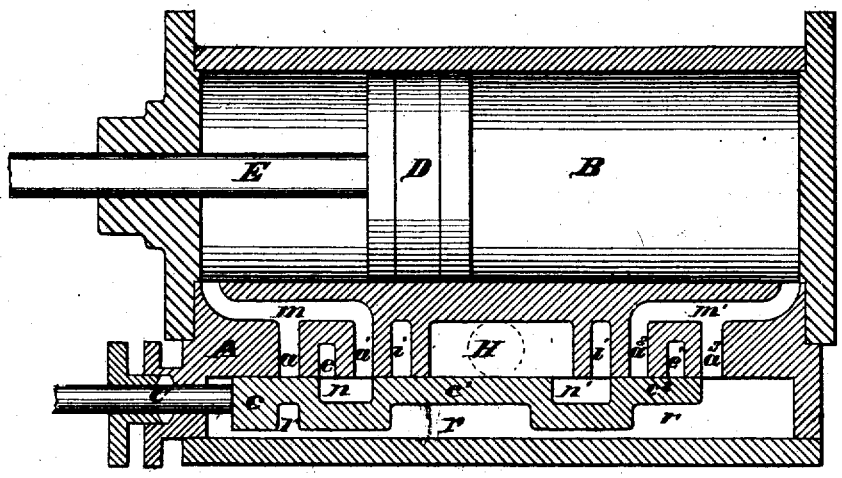

Figure 1 is a longitudinal vertical section through the steam-chest of an engine embodying the invention, and Fig. 2 a horizontal section through the steam-chest and cylinder.

Like letters refer to like parts.

The object of the present invention is to provide means for obtaining, conjointly and from a single construction, the advantages of a high-pressure and of a low-pressure steam-condensing engine; and it consists, mainly, in the peculiar disposition of the exhaust steam, substantially as is hereinafter set forth.

It further consists in the means employed in effecting such disposition of the exhaust steam, substantially as is hereinafter described.

The accompanying drawing represents a slide-valve engine.

A represents the steam-chest; B, the cylinder; C, the valve-rod; D, the piston; E, the piston-rod; F, a pipe leading to a condenser; and G G′, exhaust-pipes leading to the open air, and respectively provided with air-tight valves $g$ $g'$, which seat downward.

In Fig. 1, $m$ represents the upper and $m'$ the lower steam-port, the former, $m$, branching into two ports, $a$ and $a^1$, and the latter, $m'$, branching into two other ports, $a^2$ and $a^3$, and all passing up through the valve-seat and into the steam-chest proper. Between the ports $a$ and $a^1$, and extending down from the face of the valve-seat, is what I term a "condenser-port," $e$. Similarly arranged between the ports $a^2$ and $a^3$ is another condenser-port, $e^1$. Both the condenser-ports connect with the pipe F, as shown in Fig. 1. The steam is supplied from the boiler through a pipe, H, which may be connected with any suitable cut-off. The two ports $a$ and $a^1$ are arranged above the middle of the steam-chest, and the ports $a^3$ and $a^3$ below the middle of the chest. There is an exhaust-port, $i$, in the valve-seat, between the middle of the chest and the port $a^1$, and another exhaust-port, $i'$, similarly arranged between the middle of the chest and the port $a^2$. These last mentioned ports $i$ and $i'$ respectively connect with the exhaust-pipes G G′, Fig. 1.

The valve of the engine is a slide-valve. As shown in Fig. 2, it is, in its front or under side, and toward its upper end, provided with a chamber or recess, $n$, which, as hereinafter explained, connects or disconnects the ports $e$ and $a^1$ and $a^1$ and $i$. In the other end of the valve, and similarly arranged in its face, is another chamber, $n'$, which connects or disconnects the ports $i'$ and $a^2$ and $a^2$ and $e'$. The upper end $c$ of the valve opens or closes the steam-port $a$, and the lower end $c^2$ the steam-port $a^3$. There is a steam-space, $r$, through which live steam admitted through the pipe H circulates.

The operation of the invention is as follows: Let the piston and valve be in the position shown in Fig. 2, the piston moving upward, or to the left, as seen in the drawing, and the valve moving to the right. In this position the live steam will feed through port $a^3$ to the cylinder below the piston, and the steam in the cylinder above the piston will be exhausting through the port $a^1$, recess $n$, and condenser-port $e$. Ports $a$, $i$, $a^2$, and $e'$ will be closed, and the communication with the exhaust-port $i'$ will be closed, so that no steam can escape through it. When the piston reaches the end of its stroke, moving to the left, the valve will have moved so far to the right as to close the condenser-port $e$. The steam-port $a$ will still be closed, so that no live steam can escape through port $a^1$, recess $n$, and exhaust $i$, which will be in connection. At the same moment, in the lower end of the steam-chest, port $a^3$ will be closed, and port $a^2$ will be put in communication with exhaust $i'$ through the recess $n'$, and in an instant the live steam in the lower end of the cylinder will force the valve $g'$ up, and exhaust to the open air until the steam within the cylinder is reduced to a pressure of fifteen pounds to the inch, or one atmosphere, when the valve will of itself close. The next instant, the valve still moving to the right, the port $a$ opens, and live steam passes into the cylinder above the piston, which begins its downstroke. As the valve in its movement opens port $a$ it closes port $a^1$, and severs all communication from the upper end of the cylinder to the condenser-port $e$ or the exhaust $i$; but at the same time it opens a communication from the lower end of the cylinder to a condenser (not shown) through port $a^2$, recess $n'$, and condenser-port $e'$, and the steam in the lower end of the cylinder, which an instant before had been reduced to a pressure of one atmosphere, is now condensed to a vacuum, when the piston passes down to the end of its stroke in the same manner as I have described its passing to the upper end of the previous stroke from the position in which it was first seen, as in Fig. 2. The piston having arrived at the lower end of its downstroke, the same movement of the parts takes place that I have described as taking place when the piston reached the upper end of its stroke, but in an inverse manner. It will be noticed that the exhaust end of the cylinder is in connection with the open-air exhaust during a small portion of the stroke only. During the remainder of the stroke the open-air exhaust is shut off, and the communication is open from the cylinder to the condenser. It is only necessary to have the open-air exhaust in connection with the cylinder for a very brief time, as the inner steam-ports and the open-air exhaust-ports are large and close together, and the passage through the exhaust-pipe may be made perfectly straight, affording a free escape to the steam when in connection.

It is preferable to arrange the various parts so that the condenser shall not be put in connection with the cylinder when the crank is passing the dead-point, but a moment after, when it has passed twenty or thirty degrees beyond that point. The additional power then imparted to the piston by the formation of the vacuum in the cylinder will be thrown upon the crank at a favorable moment to utilize it to the utmost extent. At the same time care should be taken that the crank should not pass too far beyond the dead-point before the condensation takes place, since the sooner the increased power is applied the longer will such power have an opportunity to exert itself upon the piston. In thus disposing of the exhaust steam, as in the manner set forth—viz., exhausting the steam at each stroke of the piston to the open air only until the steam-pressure at the exhaust end of the cylinder equals the pressure of the atmosphere, and then diverting the remaining one atmosphere into a condenser—the efficiency of the engine is largely increased.

Having described my invention, what I claim as new therein, and desire to secure by Letters Patent, is—

1. The combination, in a steam-engine, of a valve-seat provided with the ports $a^1$, $e$, and $i$, and a valve provided with the chamber $n$, substantially as and for the purpose set forth.

2. The cylinder B, piston D, steam-chest A, provided with the ports $m$ $m'$, $a$ $a^1$ $a^2$ $a^3$, $e$ $e'$, $i$ $i'$, and space $r$, valves $g$ $g'$, pipes F and H, and valve $c$ $c^1$ $c^2$, provided with the recesses $n$ $n'$, substantially as described and shown.

THOS. L. JONES.

Witnesses:
FRED PARSONS,
H. Y. CHILD.